Feb. 12, 1946.    E. KRAMER    2,394,554
PARKING METER
Filed Feb. 7, 1942    5 Sheets-Sheet 1

INVENTOR
EUGENE KRAMER
BY Sawyer, Kennedy,
Humason & Hazell
ATTORNEYS

Feb. 12, 1946. E. KRAMER 2,394,554
PARKING METER
Filed Feb. 7, 1942 5 Sheets-Sheet 2
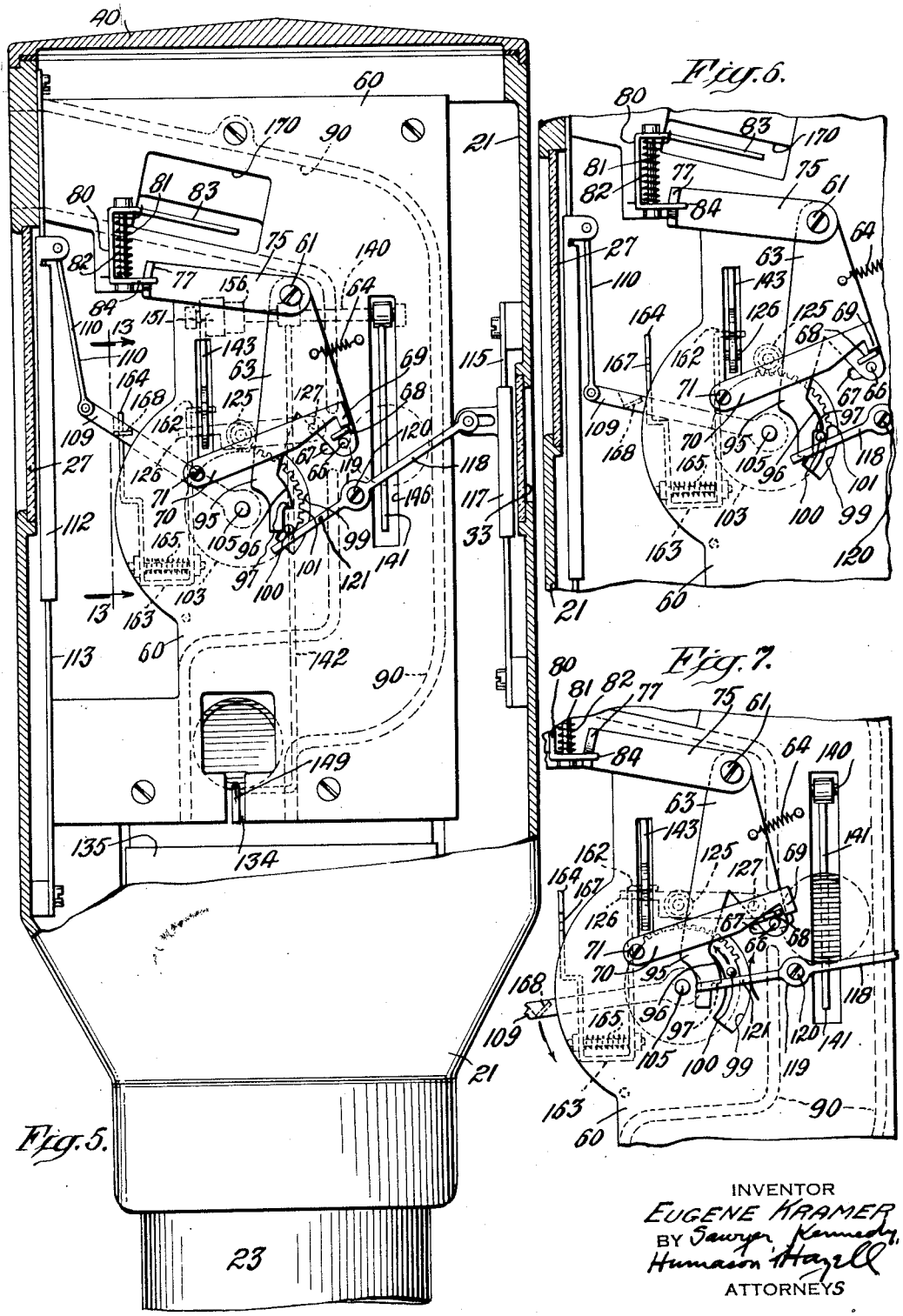
INVENTOR
EUGENE KRAMER
BY Sawyer, Kennedy,
Hunason Hazell
ATTORNEYS Feb. 12, 1946. E. KRAMER 2,394,554
PARKING METER
Filed Feb. 7, 1942 5 Sheets-Sheet 3
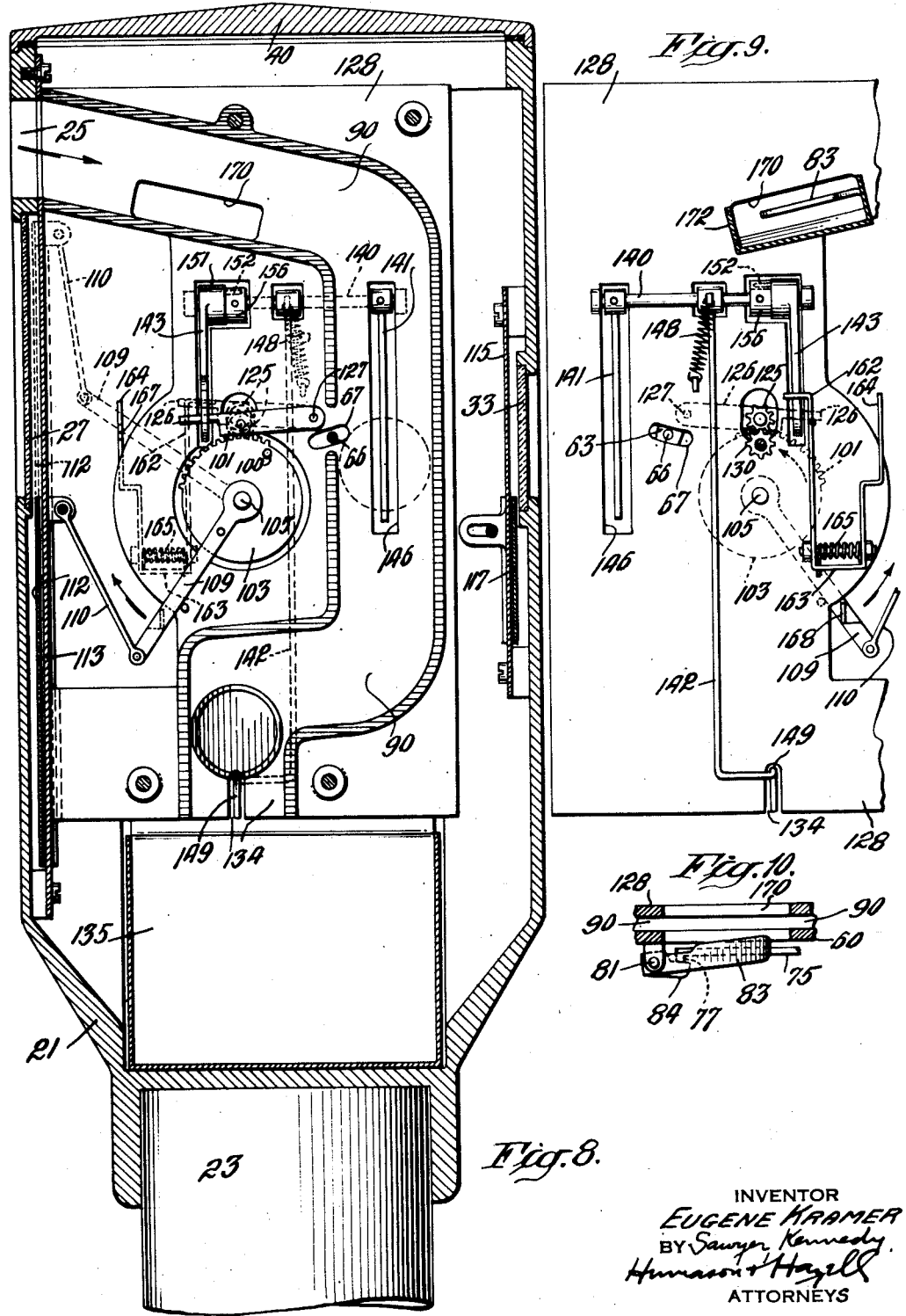
INVENTOR
EUGENE KRAMER
BY Sawyer Kennedy
Hunason & Hazel
ATTORNEYS Feb. 12, 1946. E. KRAMER 2,394,554
PARKING METER
Filed Feb. 7, 1942 5 Sheets-Sheet 4

INVENTOR
EUGENE KRAMER
BY Sawyer Kennedy
Hinnason + Hazel
ATTORNEYS

Feb. 12, 1946.     E. KRAMER     2,394,554
PARKING METER
Filed Feb. 7, 1942     5 Sheets-Sheet 5
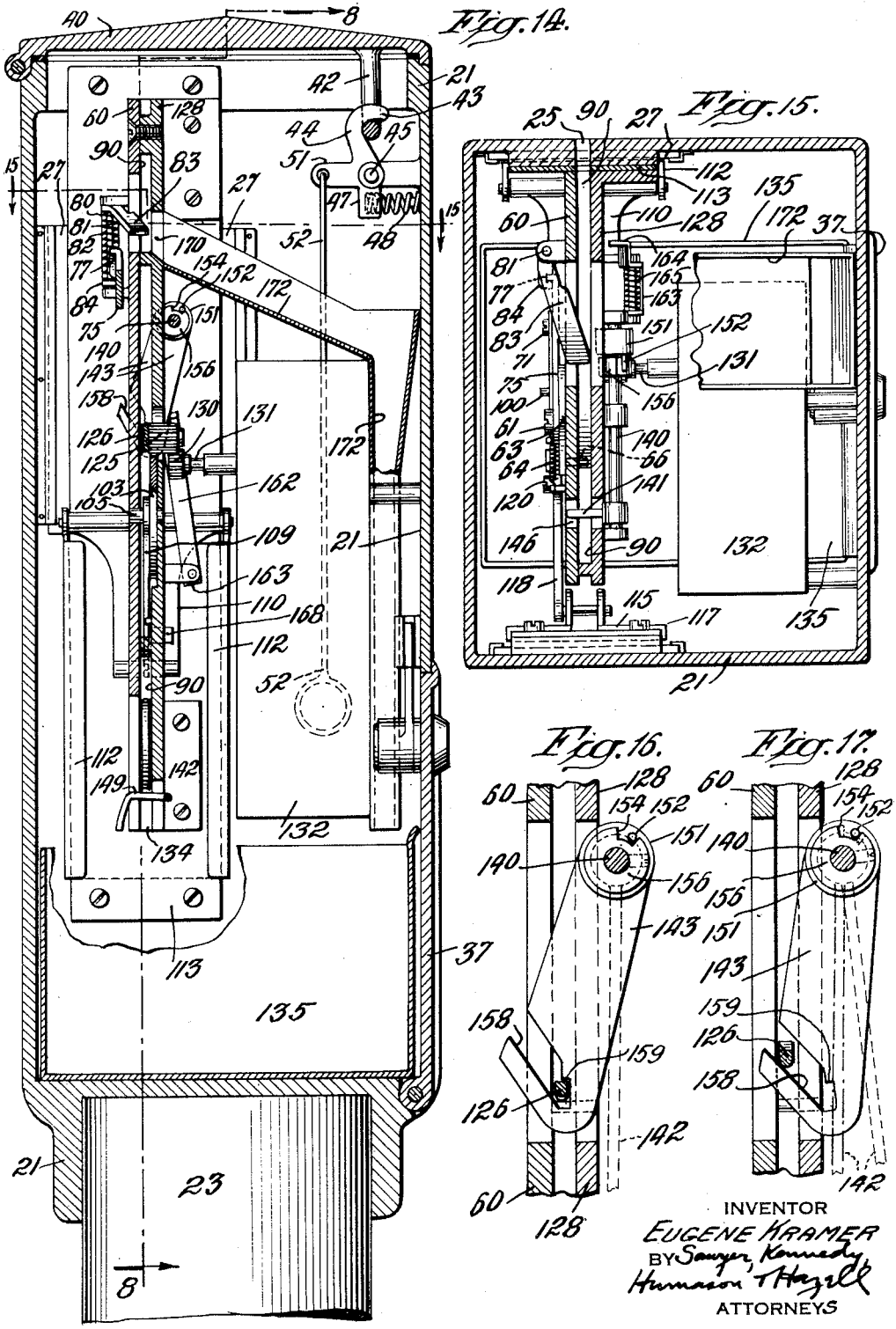
INVENTOR
EUGENE KRAMER
BY Sawyer, Kennedy
Hunnason T Hazell
ATTORNEYS Patented Feb. 12, 1946

2,394,554

UNITED STATES PATENT OFFICE 2,394,554

PARKING METER

Eugene Kramer, Astoria, Long Island, N. Y.

Application February 7, 1942, Serial No. 429,858

13 Claims. (Cl. 194—73)

The present invention relates to coin controlled elapsed-time indicating devices and as herein shown the invention is appropriately embodied in a coin actuated parking meter.

It is a principal object of the invention to provide a parking meter automatically set in operation by the deposit of either of two coins of different value, the construction being such that the coin of the smaller value, such for example as a penny, will set the mechanism to operate a signal over a relatively short elapsed-time interval, and a coin of larger denomination, such for example as a nickel, will set the mechanism to operate the signal over a relatively longer elapsed-time interval. The invention consists in the mechanism for accomplishing this result, which is particularly adapted to indicate the non-elapsed purchase time.

Further and more detailed objects of the invention will appear from the following description taken in connection with the accompanying drawings which illustrate a preferred embodiment of the invention and in which:

Figure 5 is a vertical longitudinal sectional view on an enlarged scale showing the interior of the meter of Figure 1 as it would appear with the right hand face of the casing removed;

Figure 6 is a similar but fragmentary view showing certain of the parts of Figure 5 in a different position;

Figure 7 is a view similar to Figure 6 and showing certain of the parts thereof in different positions;

Figure 8 is a view similar to Figure 5, the view being a vertical section taken on line 8—8 of Figure 14 and showing the parts included in Figure 5 as they would appear with the first interior plate removed;

Figure 9 is a vertical longitudinal sectional view similar to Figure 8 but showing the reverse side face thereof;

Figure 10 is a fragmentary horizontal sectional view taken on a portion of the line 15—15 of Figure 14 and showing the coin diverting lever in non-coin diverting position;

Figure 14 is a vertical transverse sectional view through the meter taken on line 14—14 of Figure 11;

Figure 15 is a horizontal sectional view taken on line 15—15 of Figure 14;

Figure 16 is an enlarged vertical transverse sectional view of the declutching gear actuating lever; and, Figure 17 is a similar view of the same lever in a different position.

Figure 1:
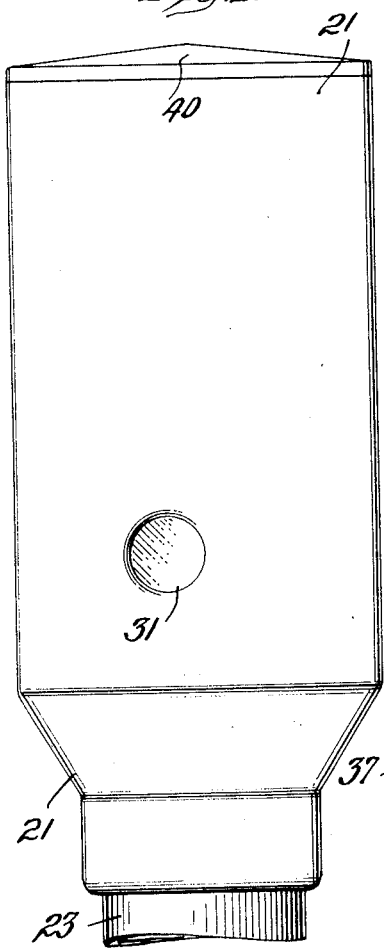
Figure 1 is a side view showing the casing of a parking meter constructed in accordance with the invention.
Figure 2:
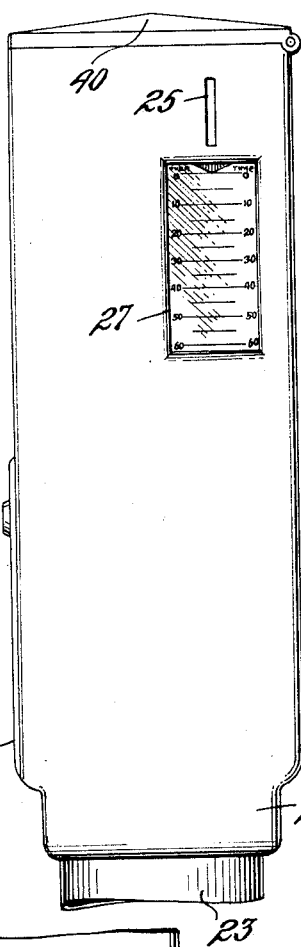
Figure 2 is a front view thereof.

Referring in detail to the accompanying drawings, and particularly to Figures 1 to 4, a parking meter casing 21 is mounted on a post or standard 23, the front face of which, as shown in Figure 2, is provided with a coin slot 25 and a window 27 through which is visible a time scale, herein shown as being a sliding vertical scale with time markings thereon, shown as comprising minute markings reading, vertically from top to bottom, from zero to 60 minutes.

As will be hereinafter described, in the present example, this full scale is disclosed to view automatically upon the deposit into the meter of the coin of larger denomination, herein exemplified as a nickel, and as time elapses a cover or red flag is moved over the scale from the bottom up so that the exposed portion of the scale in connection with the figures thereon indicates at any moment the lawful time remaining to the purchaser of the parking space in which his car may lawfully remain there. At the right hand side of the casing of Figure 2 there is a coin disclosing window 31 as shown in Figure 1.

Figure 3:
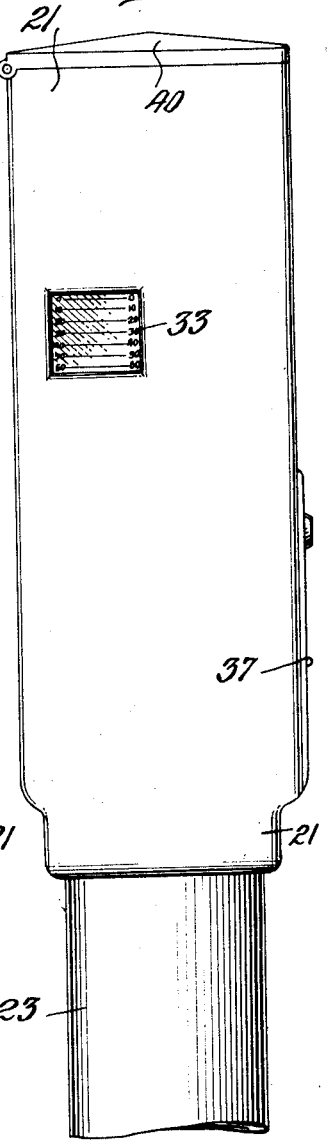
Figure 3 is a rear view of the casing of Figure 1.
Figure 4:
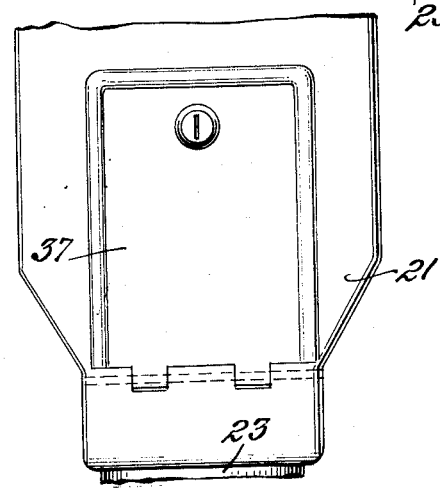
Figure 4 is a fragmentary view of the lower left hand portion of the meter casing.

At the rear of the casing of Figure 3, a second window 33 is provided through which there is disclosed a vertical minute scale similar to that disclosed in the front of the casing as shown at 27 in Figure 2. Thus the lawful time remaining to the purchaser of the parking space not only may be seen from the front, for example by the motorist himself and the officer checking overtime parkers, but also may be seen from the sidewalk by passers-by and local merchants who have an interest in seeing to it that the lawful parking time limit is enforced.

At the lower left hand side of the meter casing shown in Figure 2 a key controlled door 37 is provided to permit withdrawal of the coin collecting receptacle by the authorized person provided with the proper key.

The meter casing 21 is preferably provided with a hinged top 40 to permit access to the interior of the meter, this top being normally locked in closed position as shown in Figure 14. As here indicated the underside of the top furthest from the hinge is provided with a bracket 42 held down by the hook 43 of a lever 44 pivoted at 45 to a bracket arm 46 extending inwardly from the casing wall. The lever 44 has a spring pressed arm 47 under constant thrust of a coil spring 38 under compression and bearing at one end against the casing and at the other end against the lever arm 47 and thereby having the constant tendency to force the hook 43 into top locking position. The lever 44 also has the arm 51 from which depends the unlocking rod 52 whose lower end is herein shown as being formed as a ring and extending far enough downwardly within the casing to lie opposite the casing door 37. Thus, when the door 37 is unlocked, and only when it is unlocked, the top may be unlatched and opened.

Figure 11:
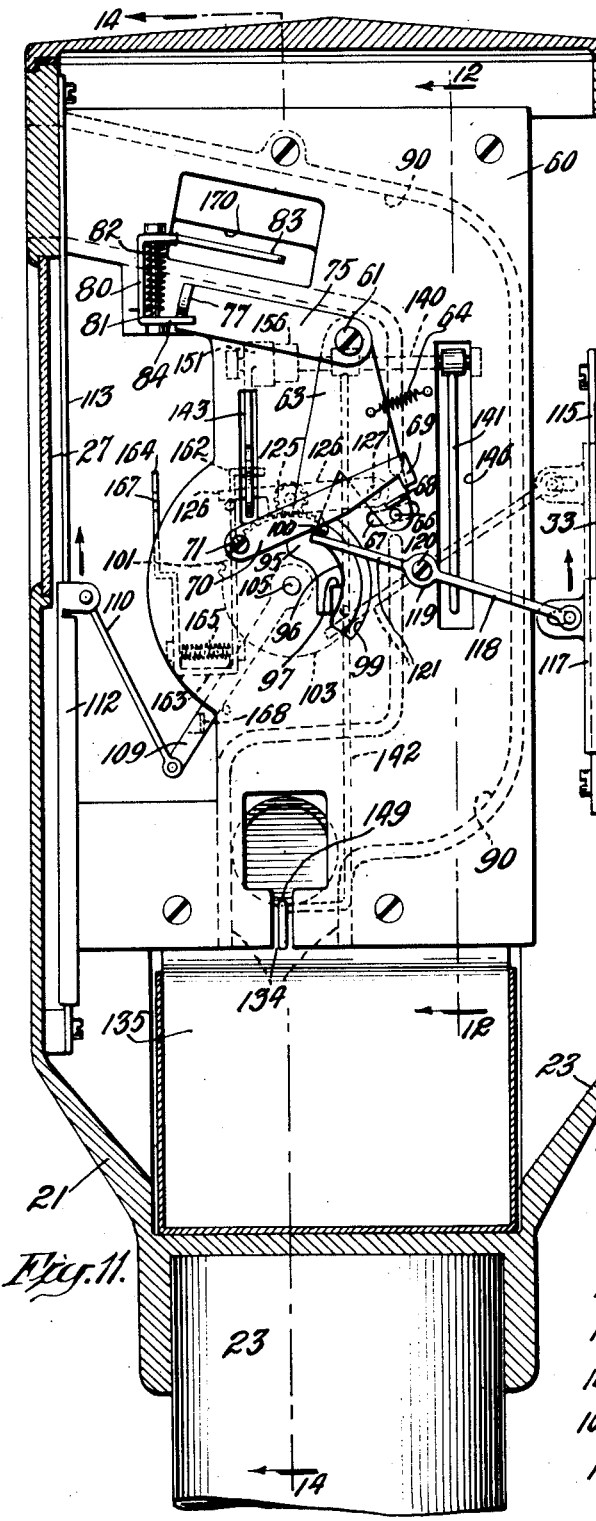
Figure 11 is a view similar to Figure 5 but showing the parts thereof in different positions.

Referring now to Figures 5 and 11, there is here shown the mechanism of the interior of the casing as it would appear from the right side thereof with the right hand side face (Figure 1) of the casing removed. Within this space is the first mounting plate 60 upon which is pivotally mounted at 61 the purchase-time control lever 63, constantly urged counter-clockwise about its pivot by a coil spring 64 under tension and having one end secured to a pin in the mounting plate 60 and the other end secured to a pin in the lever 63. Movement of the time control lever 63 is limited by a stop pin 66 fixed in the lower right hand arm of the lever and working in an arcuate limited slot 67 provided for it in the mounting plate 60. The pin 66 projects not only into the slot 67 but therethrough and beyond the plate 60 into coin chute 90 in position to be operated by the coin of larger denomination, herein exemplified by a nickel, as will appear.

Above the pin 66, lever 63 is provided with a projecting locking lug 68 for cooperation with the hooked end 69 of a locking lever 70 pivoted at 71 on the plate 60. In the position of Figure 5 the hook 69 at the free end of this locking lever rests by gravity on the lug 68 and the construction is such that when the lever 63 with its lug 68 is moved clockwise as hereinafter described the hook 69 of lever 70 drops down into the position shown in Figure 7, thus maintaining the control lever 63 in its left hand position until the locking lever 70 is raised again to its upper position.

The control lever 63 is provided at its upper portion with a substantially horizontally extending cam arm 75 which is fixed with respect to the control lever 63 and carries at its free end a small cam 77 whose highest cam surface is at the top of arm 75 and whose lowest cam surface is at the bottom thereof. The cam arm 75 and its cam are provided to control the position of a coin diverting lever 80, which as a whole is generaly U-shaped and has a vertical pivot pin 81 extending through both arms, thus mounting the coin diverting lever pivotally so that its upper coin diverting arm 83 can swing into and out of the coin slot passage 90. A coil spring 82 surrounds the pivot pin and bears at one end against the coin diverting lever and at the other end against the mounting plate 60, thereby constantly urging the coin diverting arm 83 into the coin slot 90 in coin diverting position. In the position of the parts shown in Figure 5, however, where the control lever 63 is in its right hand position, the cam arm 75 is in its lower position, so that the cam 77 acting on the lower or cam arm 84 of the coin diverter is moved into its position away from mounting plate 60 and consequently has carried with it in the same direction the coin diverting arm 83, this movement being sufficient to bring coin diverting arm 83 out of the coin slot 90 into non-coin-diverting position, as indicated in the horizontal view thereof shown in Figure 10.

Figure 12:
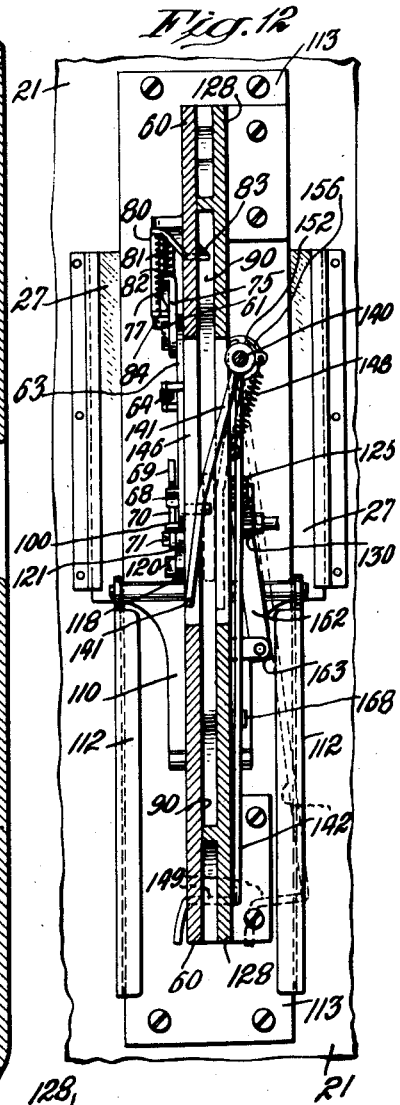
Figure 12 is a vertical transverse sectional view taken on line 12—12 of Figure 11.

When the control lever 63 is rocked to the left, however, cam arm 75 is moved upwardly with its cam surface 77, whereupon the coil spring 82 around pivot pin 81 forces the coin diverting arm 83 into coin diverting position in the coin slot 90, as shown in the upper part of the sectional view, Figure 12.

Referring again to the time control lever 63, it has a downwardly extending time control arm 95 provided with an arcuate holding surface 96 terminating in a shoulder 97. An arcuate slot 99 is provided in the mounting plate 60 through which projects a pin 100 carried by the tooth portion 101 of a gear segment 103, the teeth of which are provided only throughout about one-third of its circumference. This gear is pivotally mounted in the plate 60 at 105 and has a movement such that the pin 100 fixed to it can under the conditions hereinafter described move from the position of Figure 5 to the position of Figure 11 and back again. Downward movement of the pin 100 is caused by the slow, even driving of the gear teeth 101 through a clock mechanism, and the relatively rapid upward movement of the pin to its position in Figure 11 is caused by the relatively rapid dropping by gravity of the time-lapse indicating scale cover or red flag traveling over the time scale visible through the front window 27 of the casing.

Referring now particularly to Figure 8, which shows the mounting plate 60 removed to disclose the mechanism behind it, the pin 100 is here shown in its upper position. Fixed to the segmental gear 103, and in the position of Figure 8 extending downwardly therefrom, is an arm 109 whose outer end is connected by a link 110 to the upper end of a cover slide or red flag 112 movable vertically over the vertical time scale 113. In the arcuate movement clockwise of gear segment 103 caused by its gear teeth being slowly and evenly driven by the clock mechanism, the arm 109 is moved angularly from the full line position of Figure 8 to the dotted line position thereof, slowly thrusting up with it during this movement the link 110 which moves the scale cover or red flag 112 slowly up from the bottom to the top of the time-lapse scale 113. Thus the further the gear segment 103 is driven by the clock mechanism once it has been set in motion, the less of the time-lapse scale, from top to bottom, will be exposed to view, thereby indicating, with lapse of time, the constantly decreasing lawful remainder of the purchased parking period.

The time scale 115 at the rear of the casing and visible through the window 33 is simultaneously and correspondingly covered from the bottom up in a similar manner by its own time scale cover or red flag 117, which, as viewed in Figure 11, is moved slowly upwardly by the right hand arm 118 of a lifting lever 119 pivoted at 120 on mounting plate 60, whose other lever arm 121 extends into the downward path of travel of the pin 100, so that as the pin moves downwardly it moves arm 121 downwardly thus gradually causing the rise of the scale cover or red flag 117 over the rear time scale 115.

The arrangement is such that, upon deposit of a nickel, the mechanism will rotate the gear segment 103 the required arc or portion of a revolution to bring the two cover plates or red flags from the bottoms to the tops of their respective scales and leave them there until another coin is deposited in the casing coin slot. It is for the purpose of accomplishing this limited movement that the gear teeth 101 are provided only throughout part of the periphery of the gear segment 103, and the teeth are so positioned that they cease at that point of the periphery of the segment that arrives at the driving connector gear at the time the two cover plates or red flags have reached their uppermost positions. At this point though the clock continues to rotate the connector gear, it can rotate the gear segment no further.

For the purpose of connecting the gear segment 103 to and disconnecting it from the clock drive, the connector gear 125 (Figure 9) is provided, which turns freely on a pin carried by a lever 126 pivoted at 127 between the first mounting plate 60 of Figure 11 and the second mounting plate 128 of Figure 8. A clock driven spur gear 130 fixed on clock drive shaft 131 is located next to and adjacent the upper peripheral portion of gear segment 103, and the connector gear 125 in its lower position meshes with both the spur gear 130 and the teeth 101 of gear segment 103. In this position of the parts the gear segment 103 is thereby driven by the clock actuated shaft 131 of Figure 14. The remainder of the clock mechanism itself is not herein shown, since the clock mechanism required here need have no novelty so far as the present invention is concerned and since it is common to use clock mechanisms in this art. The clock casing, however, is shown at 132.

The coin chute or passage 90 is located between the two closely adjacent mounting plates 60 and 128 (Figures 14 and 15). Its direction is shown in dotted lines in Figures 5 and 11 and in full lines in Figure 8. From the coin slot entrance 25 (Figures 2 and 8) the coin chute or passage extends inwardly of the casing and downwardly past the coin diverting lever 83 and towards the rear of the casing, thence downwardly, and thence to the left as viewed in Figure 8, having its exit 134 over the coin receiving box or drawer 135.

In the course of its travel down the vertical portion of the coin chute or passage 90, the coin sets the meter in operation.

The mechanism by which this is accomplished is as follows. Referring particularly to Figures 8, 9 and 12, on the reverse face of the mounting plate 128 opposite the coin passage, there is mounted a horizontal rock shaft 140 which carries three downwardly extending arms 141, 142 and 143. The arm 141 is the rock shaft actuating arm and is fixed to the shaft 140 and extends through an opening 146 in mounting plate 128 into the vertical portion of the coin chute or passage 90 (see Figure 12). The arm 141 extends all the way across the width of the coin passage, so that as a coin passes down the vertical portion of the coin passage 90 it will force the lower portion of the rock shaft actuating arm 141 towards the mounting plate 128 and against the action of a small coil spring 148 having one end fast to the rock shaft and the other end fixed to mounting plate 128, for the purpose of constantly urging the actuating arm 141 into the coin slot and thereby into the path of any coin traveling downwardly therein. This rocking of the shaft 140 will be caused in the present example whether the coin is a penny or a nickel.

The arm 142 is likewise fixed to the rock shaft and at its lower end carries a coin supporting shoulder extending into the coin passage exit 134. This support is arranged to support a coin directly opposite the window 31 (Figure 1) in the meter casing. Assuming a coin is thereby supported opposite the coin window it will be evident that travel through the vertical portion of the coin passage 90 past the actuating arm 141, will cause rocking of the shaft 140, and thereby move the coin support 149 out of the coin passage in the same direction that the actuating arm 141 moves out of it, so that the coin that has been resting on the support 149 falls by gravity through the coin passage exit 134 into the coin box 135. The moment the down coming coin passes beyond the actuating arm 141, however, this arm is returned by spring 148 to its former and normal position within the coin passage and the coin support 149 is thereby returned to its coin supporting position above the coin exit 134, in position to support and retain opposite the coin window the oncoming coin that has just left the actuating arm 141. In this way the latest coin to set the meter in operation is held opposite the coin window and is thereby exposed to view. It will be noted that the lowermost part of support 149 slants outwardly and downwardly, as shown in Figure 14. Thus, as the coin leaves the support, its weight cams the support to the right, thus aiding the actuating arm 141 in rocking the rock shaft 140 in the direction to cause lifting of the connector gear.

The third arm 143 is mounted for limited rocking movement on the rock shaft 140 by means of its hub 151 which has fixed therein a short horizontally extending projecting pin 152 (Figure 16) which lies within a notch 154 provided in the upper portion of a collar 156 fixed to the rock shaft 140.

The arm 143 is a cam arm whose function is to raise and lower the pivoted arm 126 carrying the connector gear, (Figure 8) to connect the clock drive to and disconnect it from the gear segment 103 as above described. For this purpose the cam arm 143 is provided at its lower end with the cam notch 158 which receives within it the free outer end of connector-gear carrying-arm 126. Referring particularly to Figures 16 and 17 it will be evident that when the cam arm 143 rocks in a counter-clockwise direction as viewed in these figures, the connector gear carrying arm 126 will be lifted as shown in Figure 17 and as indicated in dotted lines in Figure 8, and when the cam arm 143 rocks clockwise again the clutch gear carrying arm 126 will be returned to its lower or gear engaging driving position. Locking shoulder 159 positively holds the connector gear in mesh, as shown in Figure 16, when the arm 126 is down.

The cam arm 143 is normally urged into the position of Figure 16, which is the clock driving position of the parts, by one vertical arm 162 (Figure 9) of a U-shaped cam positioner and flag support 163 (Figure 9) which is rockably mounted on mounting plate 128 by means of a short horizontal pin, surrounding which is a coil spring 165, one end of which bears against the mounting plate 128 and the other end of which bears against the cam positioner and flag support 163 and whose function is to urge the cam positioning arm 162 and the flag supporting arm 164 constantly towards the mounting plate 128. As shown in Figure 9, arm 162 bears against cam arm 143, thereby urging it constantly into the position of Figure 16.

When the cam arm 143 is rocked to the position of Figure 17 by the passage of a coin past actuating arm 141 as heretofore described, cam positioning arm 162 and flag supporting arm 164 are forced away from mounting plate 128 by the cam arm 143, and are returned toward the plate by spring 165 as soon as the downwardly traveling coin has passed beyond actuating arm 141.

Figure 13:
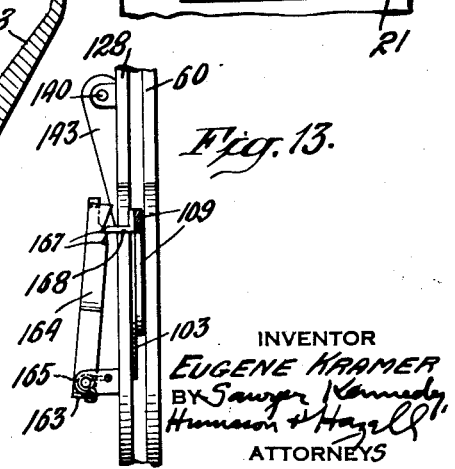
Figure 13 is a fragmentary vertical transverse sectional view taken on line 13—13 of Figure 5.

The flag supporting arm 164 (Figure 8) carries at its upper vertical edge nearest mounting plate 128 a roughened surface which may consist of a series of teeth or notches 167. The signal or flag lifting arm 109 is provided with a lug 168 (Figures 8 and 13) which, when the arm 109 reaches its upper position and the time scale cover or flag 112 has consequently reached its upper position, will ride into engagement with the roughened or toothed upper edge 167 of arm 164 as shown in Figure 5, whereby the scale cover or flag 112 will be maintained in steady stationary upper position at the zero line of the time scale. This arrangement effectively prevents any slight movement of the scale that might otherwise occur due to the fact that in this position of the parts the clutch gear 125 has reached the end of the teeth 101 but is still rotating due to being constantly driven by the clock mechanism.

Referring now particularly to Figure 14, an opening 170 is provided in the mounting plate 128 directly opposite the coin diverting arm 83 and this opening leads to a coin by-passing passage 172 which extends generally downwardly and has its exit 173 over the open top of the coin drawer 135.

It will be understood that in the present embodiment of the invention the parts are shown as being so set and arranged that a nickel will purchase 60 minutes parking time and a penny will purchase a shorter time such for example as 12 minutes, the operation of the mechanism being as hereinafter described. It is desirable however that if a nickel's worth of time has been purchased, a nickel show in the coin window 31 and if a penny's worth of time has been purchased, a penny show in the coin window 31. It will be evident that if a nickel's worth of time has been purchased, as long as there is more than the short period (here 12 minutes) indicated on the time scale as the purchased time remaining, it would be undesirable to have a penny travel down the coin chute 90 and displace the nickel opposite the coin window. The function of the coin diverter and coin by-pass chute 172 is to prevent this occurring. It will be evident however that diverted pennies instead of being delivered into the coin box as here shown could as well be delivered to a coin support freely accessible from the exterior of the casing if it should be desired to provide for the refunding of such diverted pennies, since they purchase nothing. On the other hand if the flag and time scale indicate that there is less than 12 minutes time remaining which condition will exist eventually whether the latest coin deposited was a nickel or penny, then if the next purchaser deposits a penny it should reset the flag for the full 12 minute short period and displace the preceding visible coin regardless of its denomination. This will be accomplished since at such time coin diverter 83 is held out of penny diverting position by cam arm 75.

Referring now to the operation of the meter, it will be understood that normally the cover or flag 112 is at its top position as shown in Figure 5, covering up to the zero mark the time scale that would otherwise be visible through front window 27, and that sliding cover or flag 117 is normally at its uppermost position completely covering to the zero mark the time scale 115 that would otherwise be visible through rear window 33. All the parts are then in the position of Figure 5 and the connector gear 125 is being rotated by the clock mechanism but, of course, is not rotating the gear segment 103 because in this position of the parts it has already rotated this gear segment to the end of its series of teeth 101.

If a nickel is deposited in the slot 25, it passes down the coin chute 90 past the coin diverter 83, which at this time does not project into the coin passage, and, descending the vertical portion of the passage, rocks actuating arm 141 to the right as viewed in Figure 12 and thence continues on down the coin chute to the support 149. As already described, however, the pin 66 on lever 63 was projecting into the coin chute, and the diameter of the nickel is such that in order to pass by this pin 66 it must move the pin to the left as viewed in Figure 5, thereby rocking the lever 63 clockwise far enough to permit hook 69 on arm 70 to drop to the position shown in Figure 7 and retain the lever 63 in the position of Figure 7.

While this is occurring, the rocking of actuating lever 141 by the nickel has, through rock shaft 140, caused the coin retaining shoulder 149 on coin retaining rod 142 to rock out of the bottom of the coin passage, with the result that any coin then supported thereon drops into the coin box, aiding, as it does, the rocking of the rock shaft as above described. Further, the rocking of the rock shaft 140 already described has caused the rocking of the cam lever 143 from the position of Figure 16 to the position of Figure 17, thereby lifting the clutch gear 125 out of engagement with both the clock drive gear 130 and the gear segment teeth 101. Moreover, this movement of the cam lever 143 has rocked arms 162 and 164 away from the mounting plate 128, so that the sliding cover or flag 112 is no longer held stationary in uppermost position by the teeth 167. With the connector gear 125 lifted, the weight of the sliding cover or flag 112 causes it to drop downwardly to its lowermost position shown in Figure 8. As it travels down it rocks the arm 109 from the position of Figure 5 to the position of Figure 8, which brings the gear teeth 101 from the position of Figure 5 to the position of Figure 8. At the same time this movement of the gear segment brings pin 100 from the position of Figure 5 to the position of Figure 8, and it may be noted that, as shown in Figure 7, in this upward movement of pin 100, it clears the shoulder 97 on lever 63. As a result of this upward movement of pin 100, which had been holding sliding cover or flag 117 in its upper position, this flag drops also by gravity to its lowermost position. Arrival of pin 100 to the upper position of Figure 8 brings it into contact with rocking lever 70 as shown in Figure 11, and it lifts this lever enough to disengage its hook 69 from the lug 68 on lever 63, whereupon spring 64 restores lever 63 to its normal position toward the right as viewed in Figure 5, with the pin 66 once more extending into the vertical portion of the coin chute.

As the deposited nickel drops below the bottom of lever 141, this lever is restored to its former position, projecting into the coin passage, by spring 148 (Figure 12), and the accompanying movement of the rock shaft 140 restores coin supporting shoulder 149 to coin supporting position within the coin passage in readiness to receive, stop, and support the oncoming nickel by the time it arrives there. Furthermore, this restoration of the rock shaft causes pin 152 (Figure 16) to return to its own normal position, and spring 165 (Figure 9) restores arms 162 and 164 to their former positions, arm 162 thereby restoring cam lever 143 from the position of Figure 17 to the position of Figure 16. This results in lowering of the clutch gear lever 126 to and locking it in the full line position of Figure 8, where its connector gear 125 again engages both the clock drive gear 130 and the teeth 101 of gear segment 103. At this time, however, the gear segment 103 is in the position shown in Figure 8, so that the running of the clock immediately begins to result in slow rotation of the gear segment 103 clockwise as viewed in Figure 8. The arm 109 therefore commences slowly and evenly to move the cover of the time scale from the bottom upwardly, and pin 100 bears, as shown in Figure 11, on arm 121 and gradually moves this arm downwardly, thereby resulting in the accompanying lifting of the sliding cover or flag 117 so that it commences to cover up its time scale 115 from the bottom up. Inspection of either time scale at any moment discloses what interval lawfully remains of the parking period purchased by the nickel.

The time scale covers or flags will continue to rise until they arrive in their uppermost position unless before that time another coin is deposited in the coin slot. If the time scale covers or signal flags are permitted to continue to rise to their uppermost positions, flag 117 will be held in its top position by pin 100 and cover signal or flag 112 will be held stationary in its uppermost position by teeth 167 on arm 164 as already described.

If during this 60 minute period another nickel is deposited in the slot, the same operations will occur as just described, the difference being that the cover signals or flags do not drop from their uppermost positions but from somewhere between their upper and lower positions.

It is important to note that arrival of pin 100 in its uppermost position lifts hook lever 70, but from an inspection of Figure 6 it will be seen that the furthermost position of time control lever 63 to the right cannot be reached until pin 100 has moved off the curved portion 96 of the lever 63 and has passed below the shoulder 97 thereof as shown in Figure 6. The construction is such that this occurs at the moment the sliding cover or flag covers all of the time scale except that period purchasable by the coin of smaller denomination, in the present example a penny, that purchases 12 minutes parking time.

Thus, during the first 48 minutes, time control lever 63 has not reached its full line position towards the right as viewed in Figure 5. This means that cam lever 75 has not reached its fully lowered position. Consequently the high portion of its cam 77 has not commenced to move lever arm 84 toward the observer viewing Figure 5, so that coin diverting arm 83 is during all of this 48 minute period in coin diverting position within the coin chute 90. The opening 170 into the coin diverting chute 172 is too small for a nickel to go through it, but if during the first 48 minutes of a five cent parking time purchase, a penny is deposited in slot 25, it will be diverted into by-pass coin passage 172 (see Figure 14) and either be refunded to the depositor or as here shown will be delivered to the coin box. This operation, however, has not removed the deposited nickel from ts position on support 149 opposite viewing window 31, so that the correct coin will continue to show for the parking time indicated.

When however there is 12 minutes time left of the purchased period, the pin 100 will have passed below shoulder 97, whereupon spring 64 moves time control lever 63 to its furthest position to the right as viewed in Figure 5. This additional movement of time control lever 63 causes an accompanying downward movement of cam arm 75, whereby cam 77 rocks arm 84 toward the observer viewing Figure 5, and consequently moves coin diverting arm 83 out of coin diverting position within the coin chute 90.

Therefore, if at any moment from this point on in the upward travel of the cover or flag signal, a penny is deposited, it will not be diverted into the by-pass chute 172 but will proceed along the normal coin path of chute 90, and set the mechanism for the full short period of 12 minutes.

It is important to note that in this position of the parts, the shoulder 97 on time control arm 63 lies above and in the path of upward travel of pin 100 on the gear segment.

The diameter of the penny is enough less than that of the nickel so that it passes down the coin chute 90 beyond the actuating arm 141 without moving pin 66 on the time control arm at all. The penny does, however, rock the actuating arm 141 and thereby the rock shaft 140, which, as before, lifts the connector gear 125, at the same time permitting the sliding covers or flags to begin dropping downwardly as described. Their drop is brought up short, however, the moment pin 100 hits the shoulder 97, as shown in Figure 6, and, as above indicated, this occurs when the covers or flags have dropped enough to disclose the shorter purchase period, in this instance 12 minutes. Passage of the penny below actuating arm 141 results in restoring the clock drive as before described, and the covers or flags then begin their driven upper movement as before, the only difference being that they have a shorter distance to travel to reach the top.

Rocking of actuating arm 141 by the penny rocks support 149 that had been holding the preceding coin before the coin window, causing that coin to drop into the coin box. When the penny passes the bottom of actuating arm 141, however, that arm is spring restored to its former position, and so is the support 149 restored to its former position, and in time to stop and support the penny when it arrives there and hold it in viewable position opposite the coin window.

It will be observed that during the upward travel of the covers or flags over the last or top 12 minute period, time control lever 63 is at its extreme right hand position, which means that coin diverting arm 83 is out of coin diverting position, so that at any time during this last 12 minutes a fresh penny inserted in slot 25 will not be diverted but will pass down the normal coin chute 90 and result in setting the meter for the full 12 minute period.

But regardless of where the covers or flags are with respect to the time scales, a nickel deposited in slot 25 will result as before described in the dropping of the signals or flags to their lowermost positions, to disclose on the time scales the purchase of a 60 minute period, since nickels are never diverted. This is because the opening 170 is not sufficiently large to permit the coin diverter 83 to divert a nickel therein, and also due to the fact that the spring 81 which biases coin diverter 83 to diverting position is of such dimension as to permit the biasing force thereof to be overcome by the force of a nickel travelling down the entrance portion of coin chute 90 so that the nickel pushes the diverter 83 out of its path down chute 96 to operate the mechanism and reset the meter for the full 60 minute period regardless of the time at which the nickel is inserted in slot 25, as previously pointed out. The penny, of course, is of insufficient size and weight to push diverter 83 out of its path when biased by spring 81 into diverting position and thus, as previously explained, at any time when the meter indicates more than 12 minutes parking time remains a deposited penny is diverted into chute 172.

It is obvious that the purchase periods may be varied as desired to suit the requirement of different communities; and that while it is at present preferred to drive this mechanism by an eight day clock, to be wound by the authorized collector of coins when he empties the coin boxes, other clocks may be used; and that various other changes may be made in the embodiment of the invention here described without departing from the invention as defined by the appended claims.

What is claimed is:

1. In a parking meter or the like, the combination of a movable time interval indicator, coin controlled mechanism for setting said indicator to indicate either of two different time periods, said mechanism being operable by either of two coins, of different denomination and diameter, one for each time period, said mechanism including a coin chute and a time period controller for said indicator having an actuating member projecting into said chute a distance within the diameter of the larger diametered coin only, a clock drive for said indicator controlled by said time period controller, and a clock drive disconnector projecting into the coin chute and operable by passage of either of the two coins through the chute.

2. In a parking meter or the like, the combination of a movable time interval indicator, coin controlled mechanism for setting said indicator to indicate either of two different time periods, said mechanism being operable by either of two coins, of different denomination and diameter, one for each time period, said mechanism including a coin chute and a time period controller for said indicator having an actuating member projecting into said chute a distance within the diameter of the larger diametered coin only, a clock drive for said indicator controlled by said time period controller, a clock drive disconnector projecting into the coin chute and operable by passage of either of the two coins through the chute, a coin diverter associated with the coin chute for diverting therefrom only the coin of lower denomination, and means associated with the time period controller for positioning said coin diverter in coin diverting position during all positions of the time interval indicator beyond the shorter of the two time periods and positioning said coin diverter out of coin diverting position during the shorter of the two periods.

3. In a parking meter or the like, the combination of a movable time interval indicator, coin controlled mechanism for setting said indicator to indicate either of two different time periods, said mechanism being operable by either of two coins, of different denomination and diameter, one for each time period, said mechanism including a coin chute and a time period controller for said indicator having an actuating member projecting into said chute a distance within the diameter of the larger diametered coin only, a clock drive for said indicator controlled by said time period controller, a clock drive disconnector projecting into the coin chute and operable by passage of either of the two coins through the chute, a coin diverter associated with the coin chute for diverting therefrom only the coin of lower denomination, and means associated with the time period controller for positioning said coin diverter in coin diverting position during all positions of the time interval indicator beyond the shorter of the two time periods and positioning said coin diverter out of coin diverting position during the shorter of the two periods, said coin diverter including a spring pressed coin diverting arm constantly urged into coin diverting position, and said last named means including a cam arm operable by the time period controller for camming the coin diverting arm out of coin diverting position during time indication by the indicator within the shorter of the two time periods.

4. In a parking meter or the like, the combination of movable time interval indicator, coin controlled mechanism for setting said indicator to indicate either of two different time periods, said mechanism being operable by either of two coins, of different denomination and diameter, one for each time period, said mechanism including a coin chute and a time period controller for said indicator having an actuating member projecting into said chute a distance within the diameter of the larger diameter coin only, a clock drive for said indicator controlled by said time period controller, and a clock drive disconnector projecting into the coin chute and operable by passage of either of the two coins through the chute, said clock drive having means for moving said time interval indicator, said means including a limited arcuate series of teeth, a clock driven pinion peripherally aligned therewith, and a connector gear associated with said teeth and said pinion and movable into and out of engagement therewith, said clock drive disconnector having cam means associated with said connector gear for momentarily moving said connector gear out of such engagement.

5. In a parking meter or the like, the combination of a movable time interval indicator, coin controlled mechanism for setting said indicator to indicate either of two different time periods, said mechanism being operable by either of two coins, of different denomination and diameter, one for each time period, said mechanism including a coin chute and a time period controller for said indicator having an actuating member projecting into said chute a distance within the diameter of the larger diametered coin only, a clock drive for said indicator controlled by said time period controller, a clock drive disconnector projecting into the coin chute and operable by passage of either of the two coins therethrough, a coin support for holding a coin in visible position within the meter, and means operable by the clock drive disconnector for releasing a coin from said support.

6. In a parking meter or the like, the combination of a movable time interval indicator, coin controlled mechanism for setting said indicator to indicate either of two different time periods, said mechanism being operable by either of two coins, of different denomination and diameter, one for each time period, said mechanism including a coin chute and a time period controller for said indicator having an actuating member projecting into said chute a distance within the diameter of the larger diametered coin only, a clock drive for said indicator controlled by said time period controller, a clock drive disconnector projecting into the coin chute and operable by passage of either of the two coins therethrough, a coin support for holding a coin in visible position within the meter, and means operable by the clock drive disconnector for releasing a coin from said support, said coin support having a coin actuated cam end movable by a coin leaving said support for urging the clock drive disconnector toward disconnecting position.

7. In a parking meter or the like, the combination of a clock driven movable time interval indicator, coin controlled mechanism for setting said indicator to indicate either of two different time periods, said mechanism being operable by either of two coins, of different denomination and diameter, one for each time period, said mechanism including a coin chute and a time period controller for said indicator having an actuating member projecting into said chute a distance within the diameter of the larger diametered coin only, a clock drive for said indicator controlled by said time period controller, a clock drive disconnector projecting into the coin chute and operable by passage of either of the two coins therethrough, said disconnector having cam means for disconnecting the clock drive, said cam means having a locking shoulder for normally and positively maintaining continuance of the clock drive.

8. A parking meter or the like comprising the combination of a clock driven movable time interval indicator, coin controlled mechanism for setting said indicator to indicate either of two different time periods, said mechanism being operable by either of two coins, of different denomination and diameter, one for each time period, said coin controlled mechanism including a coin chute and a time period controller for said time interval indicator having an actuating member projecting into said chute a distance within the diameter of the larger diametered coin only, a clock drive for said indicator controlled by said time period controller, and a clock drive disconnector projecting into the coin chute and operable by passage of either of the two coins through the chute, said time period controller having an indicator movement limiting stop for confining said indicator setting to the shorter time period, said actuating member projecting into the coin chute being operable by the coin of larger denomination for moving said stop out of its shorter time period limiting position.

9. A parking meter or the like comprising the combination of a movable time interval indicator, coin controlled mechanism for setting said indicator to indicate either of two different time periods, said mechanism being operable by either of two coins, of different denomination and diameter, one for each time period, said mechanism including a coin chute and a time period controller for said indicator having an actuating member projecting into said chute a distance within the diameter of the larger diametered coin only, a clock drive for said indicator controlled by said time period controller, and a clock drive disconnector projecting into the coin chute and operable by passage of either of the two coins through the chute, said time period controller having an indicator movement limiting stop for confining the indicator setting to the shorter time period, said actuating member projecting into the coin chute being operable by the coin of larger denomination for moving said stop out of its limiting position, said time period controller having means associated therewith for holding said stop out of limiting position during setting of the indicator to indicate the longer of the two time periods.

10. In a parking meter or the like, the combination of a clock driven time indicator movable to either of two starting positions, a coin chute, coin controlled mechanism for moving said indicator to one or the other of said two starting positions, said coin controlled mechanism being operable by either of two coins, of different denomination and diameter, one for each starting position, and a time period indicator setting controller having an actuator extending into said coin chute within the diameter of the larger diametered coin only.

11. In a parking meter or the like, the combination of a clock driven time indicator movable to either of two different period starting positions, a coin chute, coin controlled mechanism for causing said indicator to drop by gravity to one or the other of said two positions, said coin controlled mechanism being operable by either of two coins, of different denomination and diameter, one for each starting period position, a time period indicator setting controller having an actuator extending into said coin chute within the diameter of the larger diametered coin only, and an indicator drop limiting stop for arresting the dropping of said indicator at a point intermediate the ends of its path of travel, and movable by larger diametered coin operation of said actuator out of indicator drop limiting position.

12. In a parking meter or the like, the combination of a movable time interval indicator, and a coin controlled mechanism for setting said indicator to indicate either of two different time periods, said coin controlled mechanism being operable by either of two coins, of different denomination and diameter, one for each time period, said mechanism including a coin chute and a time period controller for said indicator having a coin actuated member projecting into said chute a distance within the diameter of the larger diametered coin only, a clock drive connectable to said time interval indicator and controlled by said time period controller, and a clock drive disconnector projecting into the coin chute and operable by passage of either of the two coins through the chute.

13. A parking meter comprising in combination, a clock drive and a clock driven element, a connector between said drive and driven element, an indicator, means to bias said indicator to an initial starting position, a connection between said driven element and said indicator to move said indicator from its initial starting position to a final position, a coin chute, a clock drive disconnector projecting into the said coin chute adapted to be momentarily actuated by any coin passing through said slot to permit the indicator to move to its initial position; stop means coacting with the said clock driven element to limit the movement of the said indicator to a position short of its initial starting position and a controller for positioning said stop means projecting into said coin chute within the diameter of a larger of two coins passing through said chute to be actuated thereby but short of a smaller diametered coin whereby different time periods will elapse before the said indicator reaches its final position depending on the diameter of the coin passing through said chute.

EUGENE KRAMER.